(12) United States Patent
Inagaki et al.

(10) Patent No.: US 9,221,143 B2
(45) Date of Patent: Dec. 29, 2015

(54) MACHINING VIBRATION SUPPRESSING METHOD AND MACHINING VIBRATION SUPPRESSING APPARATUS FOR MACHINE TOOL

(71) Applicant: Okuma Corporation, Niwa-Gun (JP)

(72) Inventors: Hiroshi Inagaki, Niwa-Gun (JP); Toshiya Shikama, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 251 days.

(21) Appl. No.: 13/793,093

(22) Filed: Mar. 11, 2013

(65) Prior Publication Data

US 2013/0309034 A1   Nov. 21, 2013

(30) Foreign Application Priority Data

May 17, 2012 (JP) ................................ 2012-113633

(51) Int. Cl.
*B23Q 17/09* (2006.01)
*B23Q 11/00* (2006.01)
*G05B 19/404* (2006.01)
(Continued)

(52) U.S. Cl.
CPC ........ *B23Q 17/0976* (2013.01); *B23Q 11/0039* (2013.01); *G05B 19/404* (2013.01); *B23Q 15/013* (2013.01); *B23Q 15/08* (2013.01); *G05B 2219/37517* (2013.01); *G05B 2219/49176* (2013.01); *Y10T 409/303752* (2015.01); *Y10T 409/303808* (2015.01); *Y10T 409/304312* (2015.01); *Y10T 409/306832* (2015.01)

(58) Field of Classification Search
CPC ........... B23Q 17/0971; B23Q 17/0976; B23Q 15/007; B23Q 15/013; B23Q 15/08; B23Q 2017/001

USPC .................................................... 408/17, 143
See application file for complete search history.

(56) References Cited

U.S. PATENT DOCUMENTS

| 5,209,326 A | * | 5/1993 | Harper ........................... 188/378 |
| 5,834,867 A | | 11/1998 | Kikuchi et al. |
| 5,876,155 A | * | 3/1999 | Link et al. ...................... 408/1 R |

(Continued)

FOREIGN PATENT DOCUMENTS

| JP | H08-296699 | 11/1996 |
| JP | 2002-292501 A1 | 10/2002 |

(Continued)

OTHER PUBLICATIONS

Japanese Office Action from a corresponding Japanese patent application (JP Application No. 2012-113633) bearing a mailing date of Nov. 4, 2015.

*Primary Examiner* — Daniel Howell
*Assistant Examiner* — Yasir Diab
(74) *Attorney, Agent, or Firm* — Burr & Brown, PLLC

(57) ABSTRACT

An apparatus includes an external input device that allows setting of the amount of runout and the phase of each cutting edge, a computation device that acquires the rotational phase of a tool and that computes the angular velocity and the phase of vibration of two, X-axis and Y-axis, feed shafts on the basis of the input amount of runout and angular velocity of each cutting edge to generate a feed shaft control signal, and a numerical control device that controls feed in the X-axis and the Y-axis directions. The numerical control device relatively vibrates a workpiece in synchronization with the angular velocity of the tool on the basis of the results of computation performed by the computation device.

4 Claims, 10 Drawing Sheets

(51) Int. Cl.
*B23Q 15/013* (2006.01)
*B23Q 15/08* (2006.01)

(56) References Cited

U.S. PATENT DOCUMENTS

| | | | | |
|---|---|---|---|---|
| 6,135,682 | A * | 10/2000 | McCalmont | 409/131 |
| 6,241,435 | B1 * | 6/2001 | Huang et al. | 409/141 |
| 6,296,093 | B1 * | 10/2001 | Norris et al. | 188/378 |
| 6,993,410 | B2 * | 1/2006 | Esterling | 700/177 |
| 7,647,853 | B2 * | 1/2010 | Lundblad | 82/1.11 |
| 2008/0289923 | A1 | 11/2008 | Suzuki et al. | |
| 2009/0017734 | A1 | 1/2009 | Osaki et al. | |
| 2010/0032879 | A1 * | 2/2010 | Ladra et al. | 269/56 |
| 2010/0092262 | A1 | 4/2010 | Hamann et al. | |
| 2010/0164156 | A1 * | 7/2010 | Bretschneider et al. | 269/86 |

FOREIGN PATENT DOCUMENTS

| | | |
|---|---|---|
| JP | 2004-351597 | 12/2004 |
| JP | 2006-141138 | 6/2006 |
| JP | 2007-044852 | 2/2007 |
| JP | 2009-006447 | 1/2009 |
| JP | 4433422 B2 | 3/2010 |
| JP | 2010-089256 | 4/2010 |

\* cited by examiner

| CUTTING EDGE NO. | ① | ② | ③ | ④ |
|---|---|---|---|---|
| PHASE DIFFERENCE (°) | 35 | 125 | 215 | 305 |
| AMOUNT OF TOOL RUNOUT (μm) | 30 | 10 | 0 | 40 |

MACHINING VIBRATION SUPPRESSING METHOD AND MACHINING VIBRATION SUPPRESSING APPARATUS FOR MACHINE TOOL

BACKGROUND OF THE INVENTION

This application claims the benefit of Japanese Patent Application Number 2012-113633 filed on May 17, 2012, the entirety of which is incorporated by reference.

TECHNICAL FIELD

The present invention relates to a machining vibration suppressing method and a machining vibration suppressing apparatus for a machine tool capable of suppressing occurrence of chatter vibration and tool chipping during milling and cutting, in particular during deep cutting such as rough machining.

BACKGROUND ART

In a machine tool that performs machining while rotating a tool, chatter vibration is caused when the amount of cutting is increased during machining to result in a degraded machined surface. In order to suppress such chatter during machining, there has been proposed a technique, for milling, in which an optimum rotation speed is calculated from the eigenfrequency of vibration of the system in which the chatter is caused and the chatter frequency during machining (see Japanese Patent No. 4433422, for example).

For cutting, there have been proposed a method in which the rotation speed of a main spindle is varied by a certain amount of displacement and a certain period in the case where a main spindle motor produces sufficient torque, and a method in which a unit that generates ultrasonic vibration during machining is attached to a feed shaft to apply high frequency minute vibration to reduce a cutting force, thereby suppressing chatter (see Japanese Patent Application Publication No. 2002-292501 (JP 2002-292501 A), for example).

Further, there has been proposed a method in which machining is performed along a trochoid to reduce the time for which an edge contacts an object to be machined to suppress an increase in chatter.

However, the method for milling in which an optimum rotation speed is calculated requires a sensor that detects chatter and a complicated control device. In the method for cutting in which the rotation speed of the main spindle is varied by a certain amount of displacement and a certain period, an excessive load is applied to the main spindle motor. The method in which high frequency minute vibration is applied to the feed shaft requires a unit that applies minute vibration, and is not suitable for deep cutting. The trochoid machining needs a change to a program, and is not so responsive that the cutting amount may not be increased.

For deep cutting, a tool with replaceable cutting edges is used for fear of tool chipping. However, there may be a difference in amount of runout among attached cutting edges due to the machining accuracy of the tool body, which may result in so-called "tool runout" which is different from the vibration described above. The runout is increased in proportion to the cutting amount, and tends to chip the cutting edges. This may make it difficult for the tool to achieve its maximum cutting capacity.

SUMMARY OF THE INVENTION

In view of the foregoing circumstances, it is therefore an object of the present invention to provide a machining vibration suppressing method and a machining vibration suppressing apparatus for a machine tool capable of suppressing chatter vibration by superimposing minute vibration on a feed shaft during machining, and capable of suppressing chipping due to runout of a tool by uniformizing cutting forces applied to a plurality of edges mounted to the tool.

In order to address the foregoing issues, a first aspect of the present invention provides a machining vibration suppressing method for a machine tool that machines a workpiece while rotating a tool mounted to a main spindle. This method includes machining the workpiece while applying forced vibration at a predetermined amplitude and a predetermined frequency of vibration to feed operation for a feed shaft during machining.

According to the method, the workpiece is machined while applying forced vibration to feed operation, that is, while relatively vibrating the workpiece. As a result, the feed rate per edge of the tool is periodically varied, thereby making it possible to suppress chatter vibration caused during deep cutting or the like.

A second aspect of the present invention provides the machining vibration suppressing method for a machine tool according to the first aspect, in which the frequency of vibration of the forced vibration is a frequency of vibration shifted by a predetermined amount with respect to a rotation speed of the tool.

According to the method, the cutting resistance is not increased or reduced in conjunction with the rotation speed of the tool, and the cutting force is non-uniform, thereby suppressing chatter vibration.

In addition, the cutting force applied to the cutting edges is distributed so that the maximum cutting force is not applied to a particular edge at all times, thereby making it possible to also suppress tool chipping.

A third aspect of the present invention provides the machining vibration suppressing method for a machine tool according to the first aspect, in which the frequency of vibration of the forced vibration is a frequency of vibration that is equal to a rotation speed of the tool.

According to the method, the forced vibration to be superimposed on the feed operation is at a frequency of vibration that is equal to the rotation speed of the tool, that is, equal to the runout of the tool. Therefore, the forced vibration can be caused to cancel the influence of the amount of tool runout, thereby suppressing tool chipping. In the case where the tool includes a plurality of cutting edges, in particular, the runout of the tool can be canceled by applying vibration that is opposite in phase to the runout of the tool so that the cutting force is uniformly distributed to the cutting edges, thereby reliably suppressing tool chipping.

A fourth aspect of the present invention provides the machining vibration suppressing method for a machine tool according to the second aspect, in which the workpiece is machined with first vibration and second vibration superimposed on the feed operation for the feed shaft during machining, the first vibration being at a frequency of vibration shifted by a predetermined amount with respect to the rotation speed of the tool and the second vibration being at a specific amplitude and at a frequency of vibration that is equal to the rotation speed of the tool.

According to the method, two types of vibration including vibration synchronized with the rotation speed of the tool and vibration shifted therefrom are applied to the workpiece, thereby suppressing chatter vibration and tool chipping as well.

A fifth aspect of the present invention provides a machining vibration suppressing apparatus for a machine tool that machines a workpiece while rotating a main spindle to which a tool having one or a plurality of cutting edges are mounted to feed at least one of the workpiece and the tool in a plane that is orthogonal to the main spindle. This apparatus includes a condition input unit that sets an amplitude and a phase of the workpiece, a vibration computation unit that computes a phase of vibration of a feed shaft on the basis of the input amplitude and phase of the workpiece to generate a feed shaft control signal, and a feed control unit that controls feed of the feed shaft, in which the feed control unit applies forced vibration based on the feed shaft control signal to the workpiece.

According to the construction, the workpiece is machined while vibrating the workpiece by applying vibration computed on the basis of the input amplitude and phase of the workpiece to the tool or the workpiece. As a result, the feed rate per edge of the tool is periodically varied, thereby making it possible to suppress chatter vibration caused during deep cutting or the like.

A sixth aspect of the present invention provides the machining vibration suppressing apparatus for a machine tool according to the fifth aspect, further including a tool information input section that acquires a rotational phase of the tool, in which the feed shaft control signal output from the vibration computation unit for execution of the forced vibration is a signal that causes vibration at an amplitude set in advance and at a frequency of vibration shifted by a predetermined amount with respect to a rotation speed of the tool.

According to the construction, the cutting resistance is not increased or reduced in conjunction with the rotation speed of the tool, and the cutting force is non-uniform, thereby suppressing chatter vibration.

In addition, the cutting force applied to the cutting edges is distributed so that the maximum cutting force is not applied to a particular edge at all times, thereby making it possible to also suppress tool chipping.

A seventh aspect of the present invention provides the machining vibration suppressing apparatus for a machine tool according to the fifth aspect, further including a tool information input section that acquires a rotational phase of the tool, in which the feed shaft control signal output from the vibration computation unit for execution of the forced vibration is a signal that causes vibration at an amplitude set in advance and at a frequency of vibration that is equal to a rotation speed of the tool.

According to the construction, the forced vibration to be superimposed on the feed operation is at a frequency of vibration that is equal to the rotation speed of the tool, that is, equal to the runout of the tool. Therefore, the forced vibration can be caused to cancel the influence of the amount of tool runout, thereby suppressing tool chipping. In the case where the tool includes a plurality of cutting edges, in particular, the runout of the tool can be canceled by applying vibration that is opposite in phase to the runout of the tool so that the cutting force is uniformly distributed to the cutting edges, thereby reliably suppressing tool chipping.

An eighth aspect of the present invention provides the machining vibration suppressing apparatus for a machine tool according to the sixth aspect, in which the feed shaft control signal output from the vibration computation unit is a signal obtained by superimposing a control signal that causes first vibration on a control signal that causes second vibration, the first vibration being at a frequency of vibration shifted by a predetermined amount with respect to the rotation speed of the tool and the second vibration being at a frequency of vibration that is equal to the rotation speed of the tool, and the feed control unit applies forced vibration based on the two types of control signals to the workpiece.

According to the construction, two types of vibration including vibration synchronized with the rotation speed of the tool and vibration shifted therefrom are applied to the workpiece, thereby suppressing chatter vibration and tool chipping as well.

According to the present invention, the workpiece is machined while applying forced vibration to feed operation, that is, while relatively vibrating the workpiece, which periodically varies the feed rate per edge of the tool. As a result, chatter vibration caused during deep cutting or the like can be suppressed.

In addition, with the forced vibration to be superimposed on the feed operation being at a frequency of vibration that is equal to the rotation speed of the tool, the forced vibration can be caused to cancel the influence of the amount of tool runout, thereby reliably suppressing tool chipping.

DETAILED DESCRIPTION OF THE INVENTION

Figure 1:
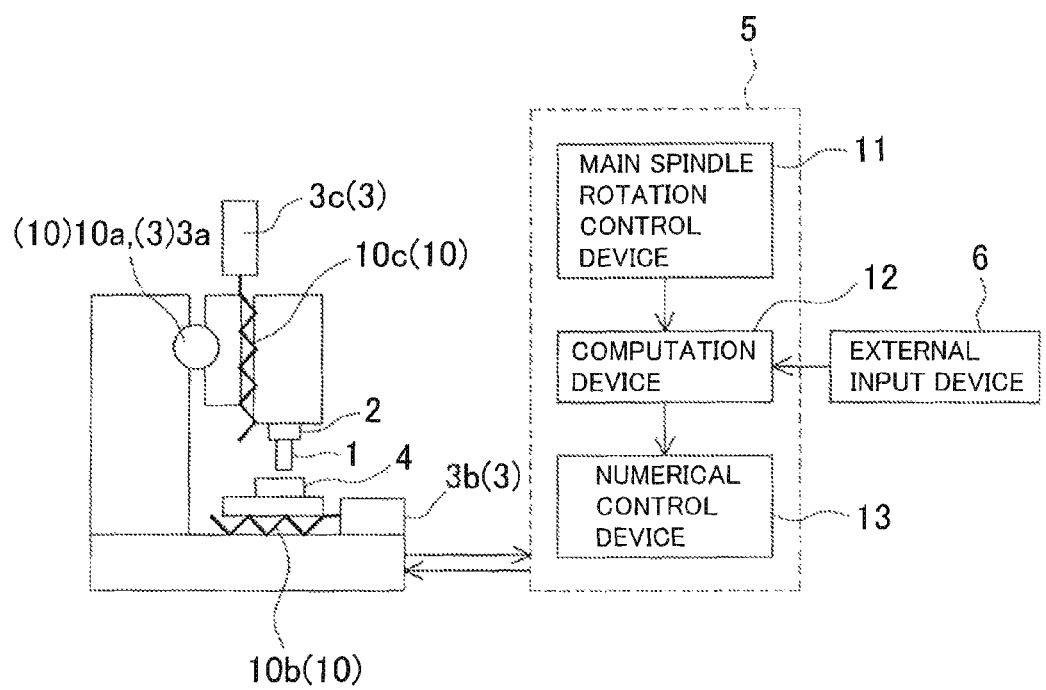
FIG. 1 is a diagram showing an example of a machining vibration suppressing apparatus for a machine tool according to the present invention.

An embodiment of the present invention will be described in detail below with reference to the drawings. FIG. 1 is a diagram showing an example of a machine tool including a machining vibration suppressing apparatus according to the present invention. Reference numeral 1 denotes a tool, 2 denotes a main spindle that rotates the tool 1, 3 denotes a feed shaft drive unit that controls the feed rate of a feed shaft 10, 4 denotes a workpiece, 5 denotes a machining vibration suppressing apparatus, and 6 denotes an external input device that allows input of conditions such as command values for the radius, the angular velocity, and the phase difference of vibration to be superimposed on the feed shaft 10, information on cutting edges, and so forth.

The feed shaft drive unit 3 includes an X-axis control unit 3a that controls an X-axis feed shaft 10a, a Y-axis control unit 3b that controls a Y-axis feed shaft 10b, and a Z-axis control unit 3c that controls a Z-axis feed shaft 10c. The machining vibration suppressing apparatus 5 includes a main spindle rotation control device 11 that controls the rotation speed of the main spindle 2, a computation device 12 that computes a correction value for each axial direction from the rotational phase of the main spindle 2, and a numerical control device 13 that controls the feed shaft 10.

In the thus configured machine tool, vibration is suppressed as follows. Minute vibration control is superimposed on NC program commands for axial feed performed by the feed shaft drive unit 3 for each axis.

For example, for arcuate machining performed in an X-Y plane which is orthogonal to the main spindle 2, minute vibration based on a path set by the following formulas 1 and 2 is superimposed on a machining path according to normal commands.

$$X = R \times \cos(\omega t - \theta_1) \quad \text{Formula 1}$$

$$Y = R \times \sin(\omega t) \quad \text{Formula 2}$$

In the formulas, R is a minute vibration radius set value, $\omega$ is the angular velocity of rotation of the tool 1, t is the elapsed time, and $\theta_1$ is the phase difference between the X axis and the Y axis. The minute vibration radius set value R may be set as desired in accordance with the machining conditions, and may be set to a value around the feed rate per edge of the tool 1 (for example, 0.1 mm).

Figure 10:
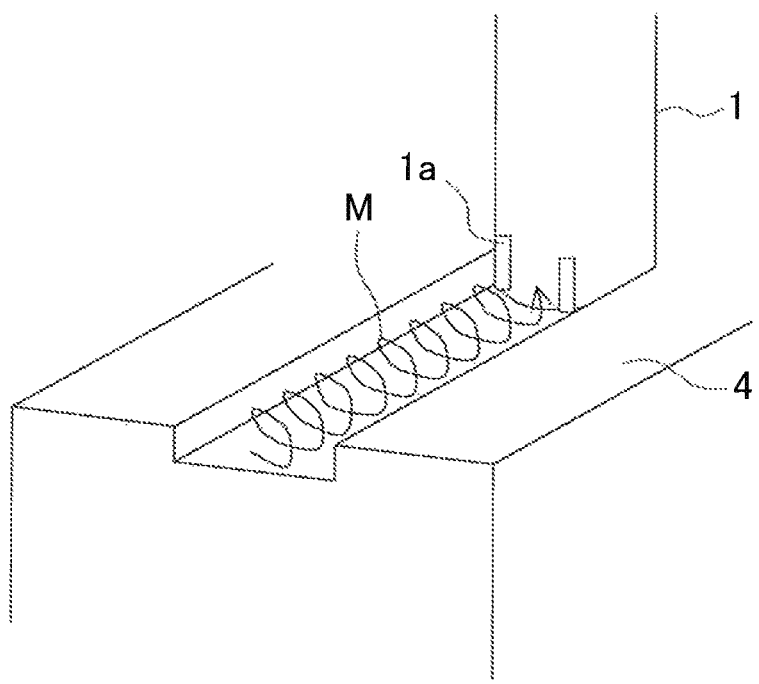
FIG. 10 is a schematic view of a tool path.

FIG. 10 is a schematic view of a path M of the tool 1 for a case where machining is performed with minute vibration superimposed on the feed shaft 10. As shown in FIG. 10, the tool 1 performs machining so as to draw circles because of the superimposed minute vibration.

In this way, machining is performed with forced vibration applied to the feed operation. That is, machining the workpiece 4 while vibrating the tool 1 or the workpiece 4 periodically varies the feed rate per edge of the tool 1, and therefore can suppress chatter vibration caused during deep cutting or the like.

Although vibration is only applied in the X-Y plane in the embodiment, vibration may be additionally applied in the Z-axis direction, which is the direction of the main spindle 2, to suppress chatter vibration.

In case of a tool with replaceable cutting edges such as an insert tool, meanwhile, runout is generally caused in the tool 1 because of the influence of the machining accuracy of the cutting edge attachment surface, which tends to cause tool chipping. Thus, the feed shaft 10 may be minutely displaced in synchronization with the main spindle 2 which is a rotary shaft of the tool 1 so as to cancel the amount of tool runout by setting an amplitude and a phase on the basis of the respective positions of the cutting edges and their respective amounts of runout measured in advance. This allows the feed rate per cutting edge to be close to a value based on the original command, thereby suppressing tool chipping.

Figures 2A, 2B:
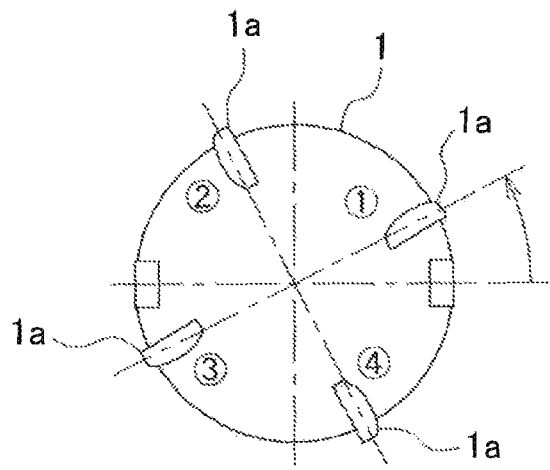
FIG. 2A is a plan view of a tool showing the arrangement of cutting edges.
FIG. 2B shows the results of measuring the amount of tool runout at each phase of the cutting edges.

FIG. 2A and FIG. 2B show an example of the tool 1 with replaceable cutting edges. FIG. 2A is a plan view of the tool 1, and FIG. 2B shows the results of measuring the relationship between the phase of each cutting edge and the amount of tool runout of each cutting edge. As shown in FIG. 2A, the tool 1 includes four cutting edges 1a provided at intervals of 90°.

Normally, pulse signals are output for each rotational angle and each rotation. Therefore, the main spindle rotation control device 11 which controls rotation of the main spindle 2 can obtain from the pulse signals information on the origin of the rotational angle of the tool 1, the position at which the pulse signals are generated, and the phase of the cutting edges 1a (hereinafter simply referred to as "phase of each cutting edge 1a").

Figure 3:
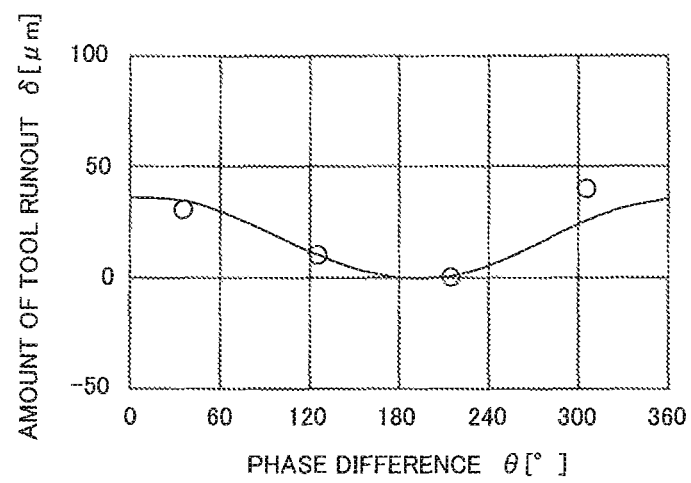
FIG. 3 is a chart showing a sine wave approximating the relationship between the amount of tool runout and the phase difference.

FIG. 3 shows a sine wave approximating the relationship between the thus measured amount of tool runout $\delta$ and the phase difference $\theta_2$ from the origin of the rotational angle or the position at which the pulse signals are generated. Because the tool 1 according to the embodiment has four edges, data have a pitch of 90°, and in this case can be approximated by the following formula 3.

$$\text{Amount of tool runout } \delta(\mu m) = 18 \times (1 + \sin(\theta_2 - 280°)) \quad \text{Formula 3}$$

In the formula, $\theta_2$ is the phase difference from the pulse signals generated from the rotary shaft of the tool 1 or the origin of the rotational angle, and 280° is a phase difference correction value.

Then, correction values are obtained by distributing the calculated amount of tool runout $\delta$ to the respective axial directions, and superimposed on the following formulas 1 and 2 to result in the following formulas 4 and 5.

$$X = R \times \cos(\omega t - \theta_1) - \delta x \quad \text{Formula 4}$$

$$Y = R \times \sin(\omega t) - \delta y \quad \text{Formula 5}$$

In the formulas, $\delta x$ is a value of the amount of runout distributed to the X-axis direction, and $\delta y$ is a value of the amount of runout distributed to the Y-axis direction.

Such vibration is superimposed on the feed shaft 10 (the X-axis feed shaft 10a and the Y-axis feed shaft 10b) to cause the tool 1 or the workpiece 4 to be subjected to forced vibration, in other words, cause the workpiece 4 to be machined while vibrating relatively. Then, the amount of runout of the tool 1 in each axial direction caused in accordance with the position (phase) of the tool 1 during machining is corrected on the feed shaft side. As a result, the tool 1 or the workpiece 4 can be subjected to forced vibration in synchronization with rotation of the tool 1 so as to cancel vibration of the tool 1, thereby suppressing the influence of the amount of runout of the tool 1.

Figure 4:
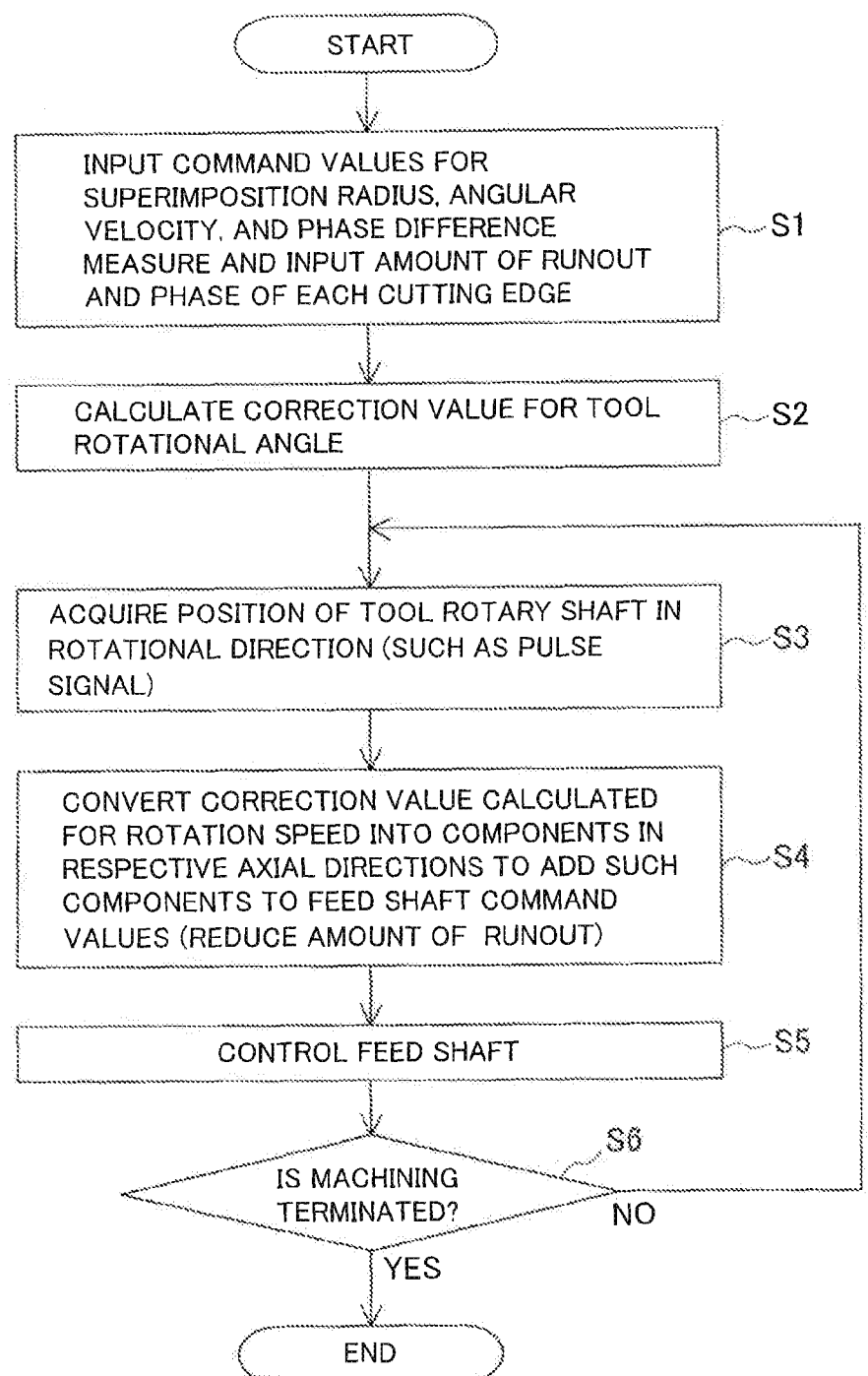
FIG. 4 is a flowchart showing the flow of chipping suppression control.

Such control is performed in accordance with the flow shown in FIG. 4. First, a feed shaft superimposition radius, an angular velocity $\omega$, and a phase difference $\theta$ are input from the external input device 6, and the amount of runout of each cutting edge 1a and the phase of each cutting edge 1a are measured and input in the same manner (S1). When data are input, the computation device 12 calculates a correction value for the rotational angle (S2), and acquires the phase relationship (phase difference correction value) between each input position of the cutting edge 1a and the tool body on the basis of the rotational angle of the main spindle 2 being monitored by the main spindle rotation control device 11 (S3).

After acquiring the phase difference correction value, the computation device 12 converts the phase difference correction value into components in the respective axial directions to add the components to feed shaft command values for the respective feed shafts (to be more exact, reduce the amount of runout) (S4). Then, the numerical control device 13 controls the feed shaft drive unit 3 on the basis of the resulting feed shaft command values (S5) to perform machining.

Machining is performed (S6) by repeating the control in and after the step (S3) in which the phase relationship between each input position of the cutting edge 1a and the tool body is acquired on the basis of the main spindle rotation speed being monitored by the main spindle rotation control device 11.

The forced vibration to be superimposed on the feed operation has a frequency of vibration that is equal to the rotation speed of the tool 1, that is, equal to the runout of the tool 1. Therefore, vibration can be superimposed on the feed shafts 10a and 10b so as to suppress the amount of runout of the tool 1 within one rotation of the main spindle 2, thereby canceling the influence of the amount of tool runout. As a result, the maximum cutting force applied to the cutting edges 1a can be reduced to reduce occurrence of tool chipping.

In addition, the reduction in maximum cutting force can also suppress chatter vibration.

The vibration suppression effect due to the control described above is specifically as follows. First, the chatter vibration suppression effect is described. Here, a steel material was machined using a milling tool of an insert type with a diameter φ of 50 mm. Comparative machining was performed under cutting conditions that the cutting velocity Vc was 45 m/min, the feed rate per edge fz was 0.1 mm/edge, a groove with an axial cutting dimension Ap of 18 mm and a radial cutting dimension Ae of 50 mm was cut, the set value R of the radius of minute vibration of the feed shafts 10a and 10b according to the present control was 0.1 mm, and the frequency of the minute vibration f was 4.8 Hz (which was the same as the tool rotational frequency).

As a result, in machining with no application of forced vibration, chatter was caused at a feed rate override of 70% to provide a machined surface with chattered mark. However, in the case where machining was performed under the conditions described above, that is, with superimposition of vibration at a frequency of vibration matching the rotation speed of the tool 1 and with a vibration radius of 0.1 mm, no chatter was caused up to a feed rate override of 100% to provide a good machined surface.

Figure 5:
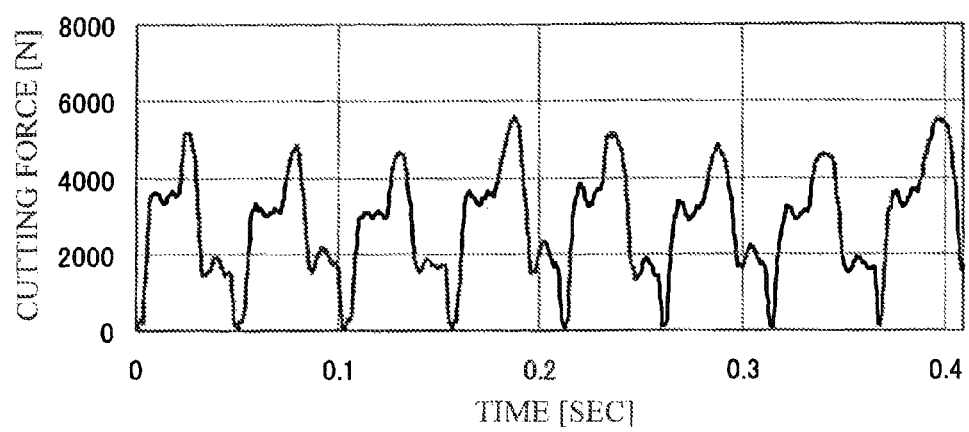
FIG. 5 is a chart showing the cutting force distribution during machining for a case where the amount of tool runout was not corrected.
Figure 6:
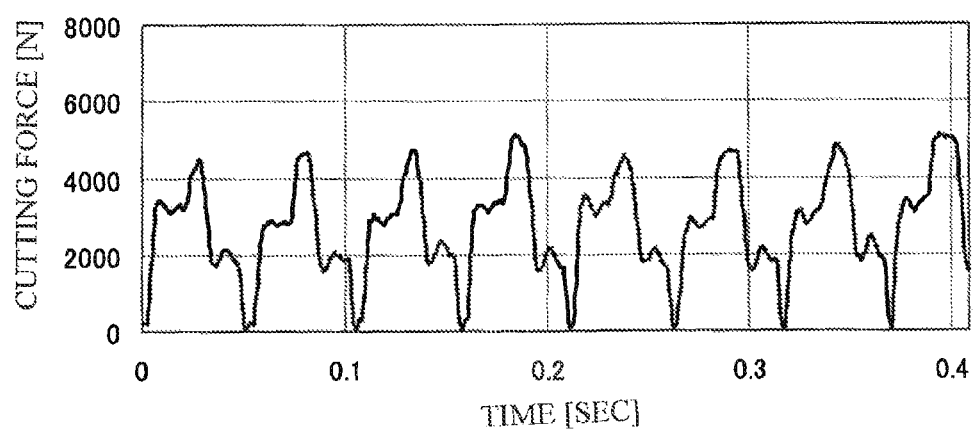
FIG. 6 is a chart showing the cutting force distribution during machining for a case where the amount of tool runout was corrected.

Next, the effect of the control according to the present invention for correcting the amount of runout of the tool 1 is described. Here, a 6-4 titanium alloy was machined under the same cutting conditions as the conditions for suppressing chatter described above. The results of measuring the cutting force during machining (for two rotations) are shown in FIGS. 5 and 6. FIG. 5 shows the measurement results for a case where the amount of runout of the tool 1 was not corrected. FIG. 6 shows the measurement results for a case where the amount of runout of the tool 1 was corrected. It should be noted, however, that the radius R of minute vibration of the feed shafts 10a and 10b was not set (R=0 mm, only correction of the amount of tool runout). Machining was performed with a tool dynamometer attached to an object to be machined.

As shown in FIGS. 5 and 6, controlling the feed shafts 10a and 10b so as to suppress the amount of runout of the tool 1 within one rotation reduced the maximum cutting force applied to the cutting edges 1a by about 10%, and reduced the relative difference in cutting force to about half. As a result, occurrence of tool chipping was reduced.

In the embodiment described above, a command for the amount of minute displacement to be superimposed on the feed shafts 10a and 10b is corrected through approximation performed using formulas. However, the correction amount for the phase may be provided as point group data or in any suitable form in consideration of the following performance, ease, etc. of the control. In the embodiment, the workpiece 4 is moved to generate vibration for Y-axis control, and the main spindle 2 (tool 1) is moved to generate vibration for X-axis control. However, vibration in both the X-axis and Y-axis directions may be generated on the workpiece 4 side, or on the main spindle 2 side. It should be noted, however, that a command value to be added to the main spindle 2 side and a command value to be added to the workpiece 4 side are opposite in phase by 180°.

Next, another embodiment for suppressing occurrence of tool chipping will be described. In the embodiment, the forced vibration to be superimposed on the feed shaft 10 is changed in accordance with the number of the cutting edges 1a. First, minute vibration indicated by the formulas 1 and 2 given above is added to NC program commands for axial feed performed by the X-axis control unit 3a and the Y-axis control unit 3b. The angular velocity of forced vibration of the feed shafts 10a and 10b is set on the basis of the tool rotational angular velocity using the following formula 6.

Angular velocity of forced vibration=(tool rotational angular velocity)×(number of edges)/(number of edges+n)  Formula 6

In the formula, n is a predetermined integer to be discussed later, the tool rotational angular velocity is 2×π×(tool rotational frequency), and the tool rotational frequency is 1/(tool rotational period). The tool rotation speed is acquired from a command value for the main spindle rotation speed in the NC program or the actual control value for the main spindle rotation speed.

In the embodiment, n is set as follows. In the case where the number of the cutting edges 1a is an even number, n is set to an odd number which may be a negative number, in particular an odd number that is close to the number of the cutting edges 1a. With n being an odd number, the cutting force is sequentially shifted among the plurality of cutting edges 1a, 1a to avoid a state in which the cutting force is continuously applied to a particular edge. This is because by controlling the ratio between the rotational angular velocity of the tool 1 and the angular velocity of forced vibration for feed shaft control in accordance with the ratio between the number of edges and an increase and a decrease therein, the relationship between the position with maximum amplitude in vibration control and the position of the cutting edges 1a is sequentially shifted upon each rotation of the tool 1.

In the case where the number of the cutting edges 1a is an odd number, on the other hand, n may not necessarily be an odd number or an even number. In the case where the number of the cutting edges 1a is an odd number, it is unlikely that the cutting force is intensively applied to a particular cutting edge irrespective of the value of n. In the case where the number of the cutting edges 1a is an even number, the same effect can be obtained even if n is not an integer only if machining is performed for a long time.

Figure 7:
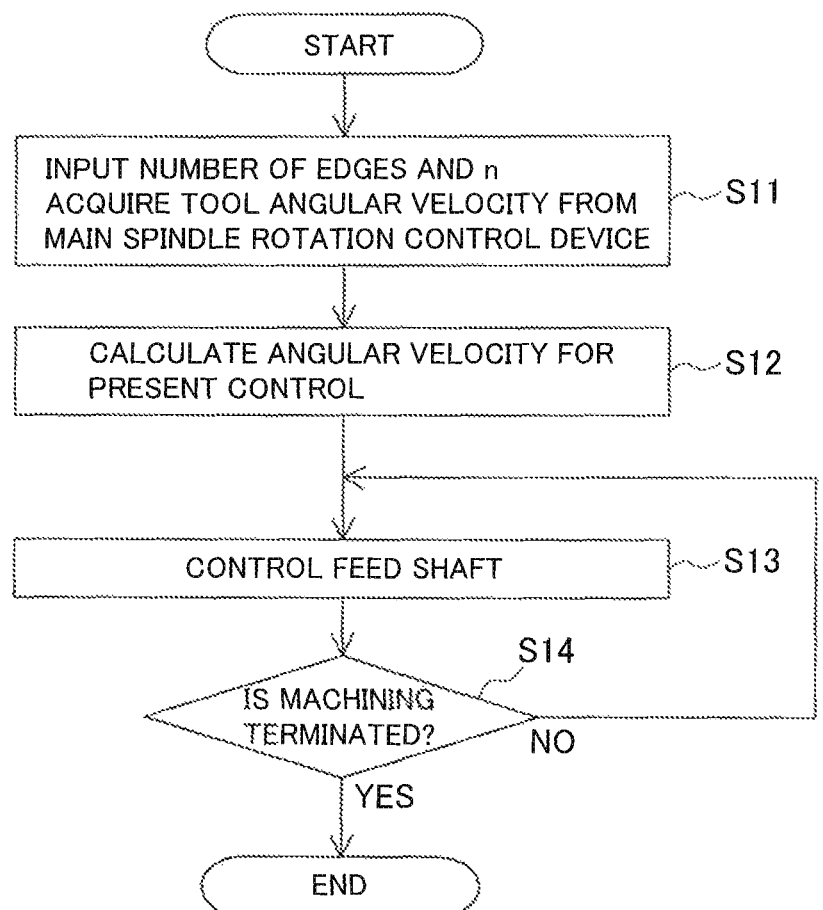
FIG. 7 is a flowchart showing another example of the chipping suppression control.

The flow of the control will be described with reference to the flowchart of FIG. 7. First, the number of edges and n are input from the external input device 6 (S11). The computation device 12 calculates the angular velocity of forced vibration according to the present control (S12) from the input data and the tool rotation speed obtained from the main spindle rotation control device 11. The numerical control device 13 controls the feed shaft drive unit 3 on the basis of the calculated angular velocity (S13) to perform machining. The feed shafts 10a and 10b are controlled until machining is terminated (S14).

Because of the control, vibration to be superimposed on the feed shafts 10a and 10b is at a frequency of vibration shifted from, rather than synchronized with, the rotation speed of the tool 1. Therefore, the maximum cutting force, which would be applied to a particular one of the cutting edges 1a in the related art, can be distributed to other cutting edges 1a. As a result, the cutting force to be applied to the cutting edges 1a can be distributed to be applied in an equally distributed manner. This makes it possible to suppress tool chipping to extend the life of the tool 1, and to suppress chatter vibration of the tool 1 at the same time because of distribution of the maximum cutting force.

The embodiment described above in which vibration that is not synchronized with the rotation speed of the tool 1 is superimposed is effective in suppressing chatter vibration irrespective of the number of edges of the tool 1, and effective if the tool 1 has a single cutting edge 1*a*.

The results of machining performed in accordance with the control described above are specifically as follows. First, in order to check the normal machining state, a 6-4 titanium alloy was machined using a milling tool of an insert type with a diameter $\phi$ of 50 mm. Cutting conditions were that the cutting velocity Vc was 45 m/min, the feed rate per edge fz was 0.1 mm/edge, a groove with an axial cutting dimension Ap of 18 mm and a radial cutting dimension Ae of 50 mm was cut, the number of edges Z was 4, the radius R of minute vibration of the feed shafts 10*a* and 10*b* according to the present control was 80 µm, and the frequency of the minute vibration f was 4.77 Hz (with n=0 and with the angular velocity of forced vibration being equal to the tool rotational angular velocity (n=0 in the formula 6 given above)).

Figure 8:
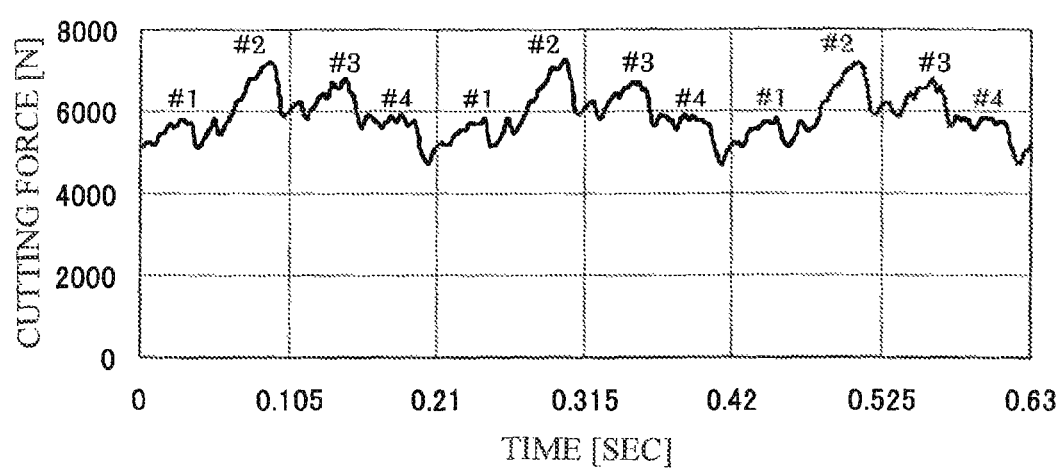
FIG. 8 is a chart showing the cutting force distribution during machining for a case where vibration was synchronized with the tool rotation speed.

FIG. 8 is a chart showing the cutting force distribution during machining performed under such conditions, in which #1 to #4 indicate the number of the four cutting edges 1*a*. Such data were acquired during machining with a tool dynamometer attached to an object to be machined.

Figure 9:
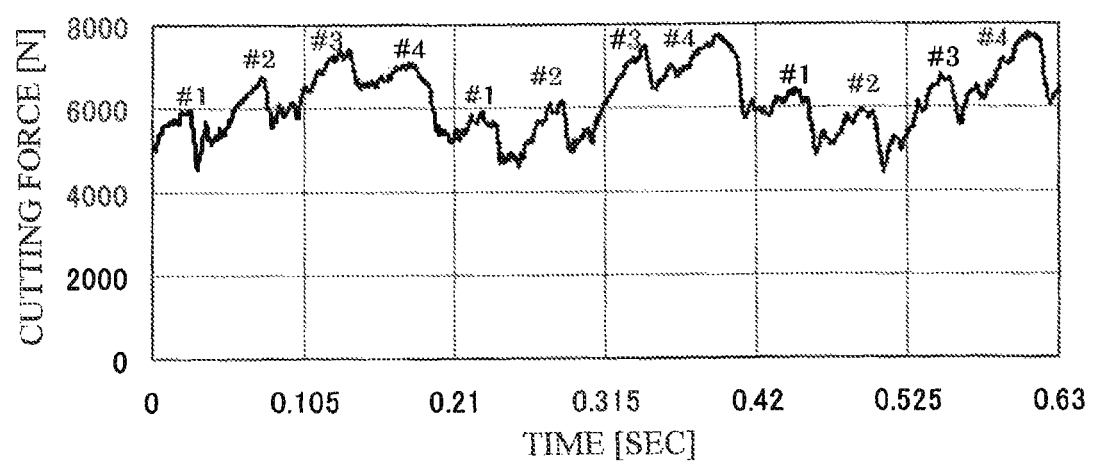
FIG. 9 is a chart showing the cutting force distribution during machining for a case where vibration was not synchronized with the tool rotation speed.

Next, in order to verify the effect of the present control, machining was performed with the frequency changed to f=3.82 Hz (⅘ of the tool rotational frequency, n=1 in the formula given above). FIG. 9 is a chart showing the cutting force distribution during machining performed under such conditions, showing a case in which the frequency of forced vibration is shifted from the tool rotation speed.

From the machining results of FIGS. 8 and 9, it is seen that in case of n=0, the maximum cutting force was applied only to a particular edge at all times (concentrates on the #2 cutting edge 1*a* in FIG. 8), but that in case of n=1, the maximum cutting force was sequentially shifted among the cutting edges 1*a*. Specifically, five crests forms one period in FIG. 9, with the maximum value sequentially shifted in the order of #3 and #4. As a result, occurrence of tool chipping was reduced.

As has been described above, slightly shifting vibration to be superimposed on the feed shaft 10 with respect to the tool rotation speed (for example, four fifths of the tool rotational frequency as discussed above) can distribute the maximum cutting force, which would otherwise be applied to a particular one of the cutting edges 1*a*, to other edges, and apply the cutting force to the cutting edges 1*a* in an equally distributed manner. Since the maximum cutting force to be applied to the cutting edges 1*a* is distributed, chatter vibration can also be suppressed at the same time.

The formulas for controlling forced vibration are not limited to those according to the embodiment described above, and may be modified appropriately in accordance with the machining conditions etc. without departing from the scope and spirit of the present invention. Point group data with a predetermined period may be used in place of the formulas.

What is claimed is:

1. A machining vibration suppressing method for a machine tool that machines a workpiece while rotating a tool mounted to a main spindle, the method comprising:
machining the workpiece while applying forced vibration at a predetermined amplitude and a predetermined frequency of vibration to feed operation for a feed shaft during machining,
wherein the frequency of vibration of the forced vibration is a frequency of vibration that is equal to a rotation speed of the tool, and
the rotation speed of the tool is acquired from a value for controlling a main spindle rotation speed, and
whereby the forced vibration to be superimposed on the feed operation is caused to cancel influence of an amount of tool runout.

2. The machining vibration suppressing method for a machine tool that machines a workpiece while rotating a tool mounted to a main spindle, the method comprising:
machining the workpiece while applying forced vibration at a predetermined amplitude and a predetermined frequency of vibration to feed operation for a feed shaft during machining,
wherein the frequency of vibration of the forced vibration is a frequency of vibration that is equal to a rotation speed of the tool, and
the workpiece is machined with first vibration and second vibration superimposed on the feed operation for the feed shaft during machining, the first vibration being at a frequency of vibration shifted by a predetermined amount with respect to the rotation speed of the tool and the second vibration being at a specific amplitude and at a frequency of vibration that is equal to the rotation speed of the tool, and
whereby the forced vibration to be superimposed on the feed operation is caused to cancel influence of an amount of tool runout.

3. A machining vibration suppressing apparatus for a machine tool that machines a workpiece while rotating a main spindle to which a tool having one or a plurality of cutting edges are mounted to feed at least one of the workpiece and the tool in a plane that is orthogonal to the main spindle, the apparatus comprising:
a condition input unit that sets an amplitude and a phase of the workpiece;
a vibration computation unit that computes a phase of vibration of a feed shaft on the basis of the input amplitude and phase of the workpiece to generate a feed shaft control signal;
a feed control unit that controls feed of the feed shaft; and
a tool information input section that acquires a rotational phase of the tool,
wherein the feed control unit applies forced vibration based on the feed shaft control signal to the workpiece, and
the feed shaft control signal output from the vibration computation unit for execution of the forced vibration is a signal that causes vibration at an amplitude set in advance and at a frequency of vibration that is equal to a rotation speed of the tool, and
the rotation speed of the tool is acquired from a value for controlling a main spindle rotation speed, and
whereby the forced vibration to be superimposed on the feed operation is caused to cancel influence of an amount of tool runout.

4. The machining vibration suppressing apparatus for a machine tool claim 3, where that machines a workpiece while rotating a main spindle to which a tool having one or a plurality of cutting edges are mounted to feed at least one of the workpiece and the tool in a plane that is orthogonal to the main spindle, the apparatus comprising:
a condition input unit that sets an amplitude and a phase of the workpiece;
a vibration computation unit that computes a phase of vibration of a feed shaft on the basis of the input amplitude and phase of the workpiece to generate a feed shaft control signal;
a feed control unit that controls feed of the feed shaft; and
a tool information input section that acquires a rotational phase of the tool, wherein the feed control unit applies forced vibration based on the feed shaft control signal to the workpiece;

the feed shaft control signal output from the vibration computation unit for execution of the forced vibration is a signal that causes vibration at an amplitude set in advance and at a frequency of vibration that is equal to a rotation speed of the tool;

the feed shaft control signal output from the vibration computation unit is a signal obtained by superimposing a control signal that causes first vibration on a control signal that causes second vibration, the first vibration being at a frequency of vibration shifted by a predetermined amount with respect to the rotation speed of the tool and the second vibration being at a frequency of vibration that is equal to the rotation speed of the tool; and the feed control unit applies forced vibration based on the two types of control signals to the workpiece, and whereby the forced vibration to be superimposed on the feed operation is caused to cancel influence of an amount of tool runout.

\* \* \* \* \*